M. S. CORBETT.
AUTOMOBILE TIRE.
APPLICATION FILED JULY 2, 1921.
1,430,436. Patented Sept. 26, 1922.
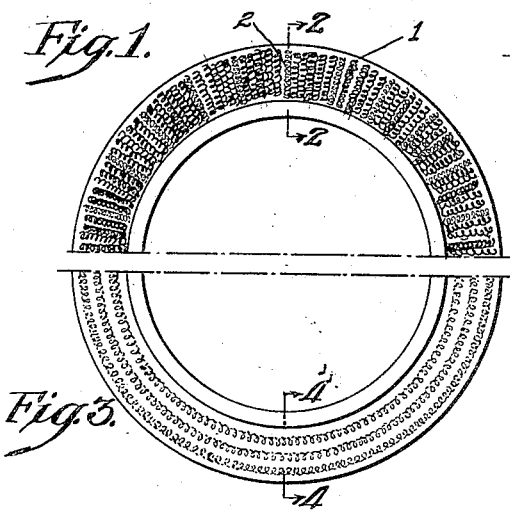
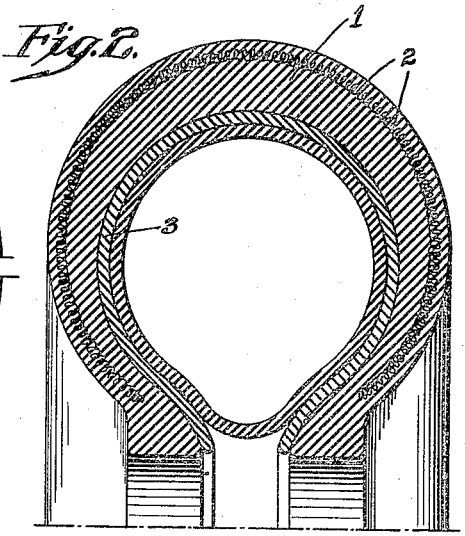
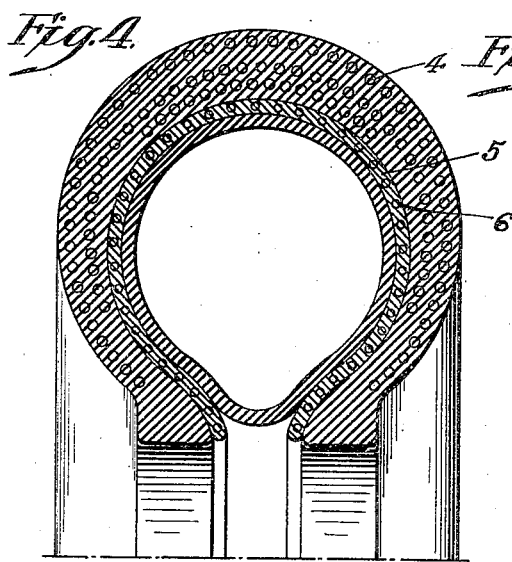
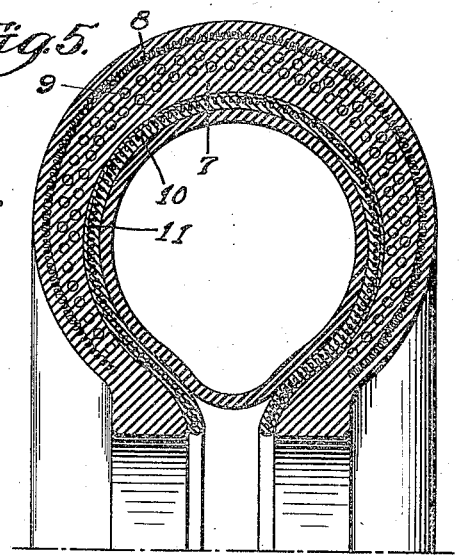
Inventor:
Martin S. Corbett.
by Watson E. Coleman
his Attorney.

Patented Sept. 26, 1922.

1,430,436

UNITED STATES PATENT OFFICE.

MARTIN S. CORBETT, OF GLASSBORO, NEW JERSEY.

AUTOMOBILE TIRE.

Application filed July 2, 1921. Serial No. 482,208.

*To all whom it may concern:*

Be it known that I, MARTIN S. CORBETT, a citizen of the United States, residing at Glassboro, in the county of Gloucester and State of New Jersey, have invented certain new and useful Improvements in Automobile Tires, of which the following is a specification, reference being had to the accompanying drawings.

It is the purpose of the present invention to provide a device of this kind, wherein a plurality of coil springs is embedded in the tire, either transversely thereof, or concentrically with the tire. In the latter case the coil springs are in series, and the springs of one series are arranged in staggered relation, so that in case of a puncture, the sharp object which may engage with the tire will contact with one or the other of the springs, and be prevented from puncturing the inner tube.

Another purpose embodies the provision of a tire wherein a pad or shield conforming to the shape of the interior of the tire is interposed between the inner tube and the tire, and also containing a series of springs, acting to further prevent the entrance of an object, which might otherwise puncture the inner tube.

A further purpose consists in the provision of a tire wherein the springs are greater in number adjacent the tread of the tire, to insure the prevention of a puncture.

A still further purpose is the provision of a tire, wherein springs are arranged transversely, as well as concentrically with the tire, a pad or shield likewise having springs, especially arranged concentrically with the inner tube.

While the design and construction at present illustrated and set forth is deemed preferable, it is obvious that as a result of a reduction of the invention to a more practical form for commercial purposes, the invention may be susceptible of changes and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in side elevation of a portion of a tire constructed in accordance with the invention, showing coil springs arranged transversely of the tire;

Figure 2 is a transverse sectional view on line 2—2 of Figure 1;

Figure 3 is a view in side elevation of a portion of the tire, showing a modified arrangement of the springs, which are concentric with the tire;

Figure 4 is a transverse sectional view on line 4—4 of Figure 3; and

Figure 5 is a transverse sectional view of a tire, wherein springs are arranged concentrically with the tire, as well as transversely thereof, and also transversely of the pad or shield.

Referring to the drawings, one designates a conventional form of rubber tire, which may be of the type shown, or may have clincher flanges, or other construction, whereby the tire may be secured on the rim of the wheel.

Embedded in the tire transversely thereof is a plurality of coil springs 2, arranged at intervals. Any number of springs may be employed, therefore the invention should not be limited in this regard.

The ends of the springs terminate close to the opposite inner edges of the tire, so as to act as an armor. In order to produce armor, the coil springs may be arranged closer together than shown in Figure 1, and if necessary an additional set of coil springs may be arranged interiorly of the springs 2, in order that each spring may be offset between every two of the outer springs, and if the springs are arranged to spring close together sharp objects may be prevented from penetrating the wall of the tire.

In Figure 2 which is a section of Figure 1, there is disclosed a pad 3 constructed of rubber or some suitable composition interposed between the inner tube and the tire, thereby acting to prevent a sharp object or article from penetrating the inner tube. This pad or shield may be supplied with a series of coil springs, such as shown in the other figures of the drawings.

In Figures 3 and 4 a plurality of series of coil springs 4 are arranged concentrically with the tire, and the springs of one series are arranged in staggered relation with the coil springs of an adjacent series, thereby preventing a sharp object, such as a nail or the like from penetrating the tire and puncturing the inner tube. It will be noted that in this embodiment of the invention, a greater number of coil springs are arranged adjacent the tread of the tire, to insure the prevention of puncturing the inner tube. Also in Figures 3 and 4 the pad or shield 5 (which is composed of rubber or a composition, leather or the like) has embedded therein a plurality of coil springs 6. These springs are arranged concentrically with the wheel the same as the springs 4. The additional set of springs 6 also act to prevent or obviate puncturing the inner tube. In fact all the springs combined not only act to prevent puncturing, but also to retain the tire in shape, especially when deflating.

In Figure 5, the tire 7 has embedded therein a plurality of transversely disposed springs 8, and a plurality of series of springs 9, which are arranged concentrically with the wheel and the tire. The latter springs are arranged in staggered relation, and owing to the springs 8 being disposed transversely, a network of springs is afforded, materially acting to prevent the penetration of sharp objects entirely through the tire and puncturing the inner tube. A pad 10, either of rubber, or some suitable composition, or leather is also interposed between the inner tube and the tire, and has embedded therein a plurality of coil springs 11 transversely arranged. It is the aim to arrange the coil springs 11 to be staggered relatively to the springs 8, thereby increasing the network of springs. The network composed of the springs 8, 9 and 11 is practically impenetrable by a sharp object, such as a nail, thereby insuring the prevention of puncturing the inner tube. The tire may be fastened on the rim of the wheel in any manner found convenient and practical, and owing to the pad or shield being utilized between the inner tube and the inner surface of the tire a smooth surface adjacent the inner tube is afforded, in case the springs of the tire protrude through the inside surface of the tire, thereby preventing the inner tube from being ruptured, by contact with an uneven surface.

The invention having been set forth, what is claimed as being useful is:

The combination with a rubber tire casing, of a plurality of coil springs embedded in the casing transversely thereof and immediately adjacent the outer surface of the tire, a plurality of series of coil springs embedded in the tire between the first coil springs and the inner surface of the tire casing, one series adjacent the inner surface of the tire casing, the other series immediately adjacent the transverse springs and the inner series, said series of coil springs extending circumferentially of the tire and at right angles to the transverse springs, the intermediate circumferentially arranged springs being in staggered relation, whereby the convolutions of the inner series register with the spaces between the outer series of said circumferentially arranged springs, thereby preventing the penetration of a sharp object and the puncturing of the inner tube, the transverse and intermediate circumferential springs terminating a short distance from the rim engaging flanges of the tire casing, thereby leaving the flanges to be freely flexible, whereby they may be easily and quickly engaged and disengaged on and from the rim.

In testimony whereof I hereunto affix my signature.

MARTIN S. CORBETT.